Jan. 29, 1935.   R. J. NORTON   1,989,211
COMPOSITE BRAKE DRUM
Filed Nov. 21, 1930
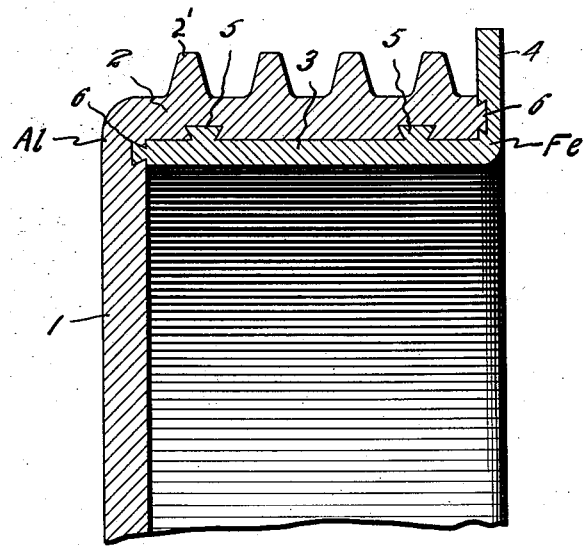
Inventor
RAYMOND J. NORTON
By M. W. McConkey and
Semmes & Semmes
Attorneys Patented Jan. 29, 1935

1,989,211

UNITED STATES PATENT OFFICE 1,989,211

COMPOSITE BRAKE DRUM

Raymond J. Norton, Washington, D. C., assignor to Bendix Brake Company, South Bend, Ind., a corporation of Illinois Application November 21, 1930, Serial No. 497,273

2 Claims. (Cl. 188—218)

This invention relates to brake parts and more particularly to an improved composite brake drum structure for use on automotive vehicles and airplanes.

In the manufacture of brake drums, it has been recognized in the past to be advantageous to combine the relative light weight of aluminum and aluminum alloys with the tensile properties of steel. It has been proposed, for example, to provide a brake drum which consists of an outer casing of aluminum provided with a frictional engaging surface of a more wear resistant material, such as a steel.

However, this type of structure has decided disadvantages. While aluminum is highly desirable because of its specific gravity, its coefficient of expansion is relatively very high, being approximately five times that of iron. Hence in this type of structure the aluminum member tends to expand at a very rapid rate, thereby drawing away from the iron or steel member. For this reason proponents of this type of structure have to resort to different expedients in order to prevent relative movement of the iron ring.

The advantage of the lightness of aluminum may be combined with the desirable structural properties of the irons and steels by a proper choice of material and by a proper structure.

It is, therefore, an object of the present invention to provide a composite brake drum which combines the lightness of non-ferrous materials with the wear qualities of ferrous steels and alloys.

Another object is to provide a composite brake drum which is comprised in part of aluminum and which, therefore, is characterized by a low specific gravity and a high heat conductivity, and which also is provided with a wear surface more resistant to abrasion than aluminum.

Another object is to provide a brake drum characterized by high resistance to wear, lightness and high heat conductivity and dissipation.

Another object is to provide a brake drum of light weight, high resistance to wear and to the distortive effects of frictional braking.

With these and other equally important objects in view, the invention comprehends the idea of forming a composite brake drum by providing an outer brake casing of a special aluminum alloy and a frictional engaging surface of a steel or ferrous alloy. The aluminous material is chosen as one which presents the desirable characteristics of high heat conductivity and dissipation, but in which the heat expansion is considerably less than the usual aluminous materials and which more closely approximates the heat expansivity of iron.

In order to more clearly explain the invention, a typical physical embodiment is shown in the accompanying drawing.

One manner of achieving the objects mentioned above comprises providing a composite brake drum which includes a ferrous metal characterized by high resistance to wear and which provides a frictional engaging surface upon which is cast or otherwise formed an aluminous drum member. The aluminous material chosen is one which has a specific gravity, a heat conductivity factor and a heat emissivity factor approximately equal to ordinary aluminum and aluminous alloy, but which has a coefficient of thermal expansion which is considerably less than such alloys. By such an association of materials, therefore, it will at once be appreciated that the disadvantages of prior similar composite structures is largely obviated inasmuch as in the present construction there is less tendency for differential expansion and therefore less likelihood of differential movement between the ferrous and non-ferrous parts.

In accordance with the present invention, therefore, a brake drum may be made up which comprises a drum head 1 formed with an integral circumferential flange 2. The flange, if desired, may be provided with heat radiating fins 2'. The metal chosen for the drum casing is one which has a considerably greater heat conductivity than iron, and tensile strength which is sufficient to subserve the required functions, a weight which is considerably less than iron and a coefficient of expansion approximating that of iron.

As is known, most metals and alloys which present a high coefficient of thermal conductivity are also characterized by a high coefficient of expansion. However, according to the present invention a special material is employed which, although of high conductivity, is not of a correspondingly high expansion.

These desirable characteristics are found in a recently developed alloy known in the trade as Alloy No. 132. This is an aluminum base alloy containing approximately 14% of silicon and varying small amounts of magnesium, copper and nickel. This alloy is characterized by a very high conductivity and a much lower coefficient of expansion than the typical aluminum alloy. For example, the coefficient of expansion of this material is approximately 18% less than that of the usual aluminum alloys employed in the automotive industry and approximately 20% less than that of aluminum. Its coefficient of expansion roughly approximates that of the non-magnetic irons and steels.

In order at the one time to obtain the advantages of the light weight and high heat dissipation properties of aluminum and the wear resistance of steels or other strong and hard ferrous metals, a steel liner 3 is provided. This may be either a low carbon or a high carbon steel or a steel alloy. The high carbon steel is preferable because of its increased hardness. The liner may be the usual type of low carbon steel employed in brake drums; or it may be a cold worked low carbon steel or a heat treated and tempered steel; or it may be a low carbon steel the frictional engaging surface of which has been case hardened or otherwise treated to increase its hardness and tensile strength.

The two members, that is to say the aluminous drum casing and the ferrous frictional engaging surface, are formed up as an integral structure. This may be done by providing the braking flange 3 with an integral radial extending flange 4 and the short lateral projections 5 and 6. The elements 5 and 6 are shown in the drawing as dovetail arrangements but it will be understood that these are shown as merely typifying any type of extension either on the steel member or on the aluminum member which provides for a more intimate contact and locking of the two parts.

The drum may be made up in a manner well known to those skilled in the art by casting the aluminum drum casing around the ferrous frictional engaging section so as to form a unified or composite locked member. This locking function may be obtained by forming projections, as described, on the steel member or by forming depressions in the steel member, or by a combination of the two, so that the aluminous alloy during casting may be flowed into interlocking engagement with the steel member.

As shown in the drawing, the frictional engaging surface is extended radially outwardly to form a marginal flange 4. This serves as a rigidifying lip for the drum and provides a ferrous closure member which cooperates with a similar ferrous non-rotating closure member known generally as a backing plate. By this construction a tight closure may be secured inasmuch as the two metals are quite similar in expansion properties. It will be noted that if desired the braking flange may be provided with other extensions which pass upwardly through the material of the drum casing on the circumferential flange so that the braking flange may in effect project directly into the atmosphere to be subjected to direct cooling action by convection and by radiation.

Also, if desired, the metal of the braking flange may be extended downwardly through the drum head 1 in the form of arms or spiders so as to obtain the benefit of the increased shear resistance of the ferrous metals.

It will now be observed that the composite brake drum structure at the one time combines the advantages of the light weight of aluminous material and the wear resistance of steels. The material employed for the brake drum casing has, in fact, a higher coefficient of thermal expansion than the metal of the lining. However, this difference in expansion is, in the present construction, largely neutralized by a number of factors. In the first place the braking flange is extended outwardly, in the form of radial flange 4, so as to provide a direct heat conductive path from the heat generative surface to the atmosphere. By this expedient the frictional heats which are generated at the frictional engaging surface are more rapidly dissipated than if the liner were completely enclosed.

Again it is to be noted that the aluminous drum casing is provided with a very large surface area with respect to its total mass. Due to its high heat conductivity and its high area of heat dissipation, the generated frictional heats which are transmitted to it are rapidly dissipated. Furthermore, this dissipation of heat may be accelerated by treating the exposed surface of the drum casing to increase heat emissivity. This, for example, may be done by coating the outside surface with aluminum oxide or by directly subjecting the material to anodic oxidation. Therefore, by providing for a more rapid dissipation of heat from the drum casing, the small difference in expansion between the casing and the liner are substantially neutralized so that any tendency to relieve movement of creep between the casing and the lining is largely eliminated.

While one specific embodiment has been described, it will be obvious that a wide number of modifications may be developed within the scope of this disclosure. For example, if desired, the tongue and groove connection between the liner and drum may be so positioned as to provide for removal and insertion of the hardened liner so as to present ready replaceability. As noted, the brake liner may be made up in a wide variety of forms to improve any one of the desired characteristics. Hence, while a specific embodiment has been described, it is to be understood that this is given merely as an example of how the principles of the invention may be incorporated in a given physical structure. It is not, therefore, intended to be limited to the device shown and described except as such limitations are clearly imposed by the appended claims.

I claim:

1. A brake rotor comprising a drum head and circumferential flange of an aluminous alloy, and a steel part forming a frictional engaging surface and a rigidifying radial flange extending outwardly from said surface, said circumferential flange and steel part having means formed thereon to lock them together and having approximately equal coefficients of expansion.

2. A brake drum comprising a drum head and circumferential flange of a cast aluminous alloy, and a ferrous metal part forming a frictional engaging surface and a rigidifying flange at the outer edge of the drum, said circumferential flange and ferrous metal part having interengaging means formed thereon to lock them together and having approximately equal coefficients of expansion.

RAYMOND J. NORTON.